(12) United States Patent
Caselli et al.

(10) Patent No.: US 11,828,542 B2
(45) Date of Patent: Nov. 28, 2023

(54) SHELL AND TUBE HEAT EXCHANGER

(71) Applicant: Casale SA, Lugano (CH)

(72) Inventors: Cristiano Caselli, Como (IT); Luca Redaelli, Drezzo (IT)

(73) Assignee: CASALE SA, Lugano (CH)

(*) Notice: Subject to any disclaimer, the term of this patent is extended or adjusted under 35 U.S.C. 154(b) by 0 days.

(21) Appl. No.: 16/975,383

(22) PCT Filed: Mar. 7, 2019

(86) PCT No.: PCT/EP2019/055660
§ 371 (c)(1),
(2) Date: Aug. 24, 2020

(87) PCT Pub. No.: WO2019/179776
PCT Pub. Date: Sep. 26, 2019

(65) Prior Publication Data
US 2021/0080186 A1    Mar. 18, 2021

(30) Foreign Application Priority Data
Mar. 22, 2018 (EP) .................................... 18163395

(51) Int. Cl.
*F28D 7/12* (2006.01)
*F28D 7/06* (2006.01)

(52) U.S. Cl.
CPC ............... *F28D 7/12* (2013.01); *F28D 7/06* (2013.01)

(58) Field of Classification Search
CPC ..................................... F28D 7/12; F28D 7/06
See application file for complete search history.

(56) References Cited

U.S. PATENT DOCUMENTS

| 4,576,225 A * | 3/1986 | Nassauer ................. F28D 7/06 165/161 |
| 5,058,664 A | 10/1991 | Gentry |
| 5,642,778 A | 7/1997 | Gentry |

(Continued)

FOREIGN PATENT DOCUMENTS

| CN | 204787951 U | 11/2015 |
| CN | 105408686 B | 5/2017 |

(Continued)

OTHER PUBLICATIONS

International Preliminary Report on Patentability issued in connection with PCT/EP2019/055660.

(Continued)

*Primary Examiner* — Paul Alvare
(74) *Attorney, Agent, or Firm* — Akerman LLP (57) ABSTRACT

A shell and tube apparatus (1) includes an outer shell (2); a first tube bundle (3) and a second tube bundle (4) coaxial with each other; a first inner shell (5) and a second inner shell (6); the first inner shell surrounds the first tube bundle and is arranged between the two tube bundles; the second inner shell surrounds the second tube bundle and is arranged in the space between the second tube bundle and the outer shell (2); the first tube bundle (3) operates as a preheater; the second tube bundle (4) operates as a boiler; the coaxial inner shells (5, 6) define a counterflow path for a hot fluid which passes through the shell side.

14 Claims, 5 Drawing Sheets

(56) References Cited

U.S. PATENT DOCUMENTS

| | | | |
|---|---|---|---|
| 2005/0284606 A1* | 12/2005 | Stahl | ............... F28F 9/22 |
| | | | 165/58 |
| 2011/0302910 A1 | 12/2011 | Burgers et al. | |
| 2016/0273845 A1* | 9/2016 | Rizzi | ............... B01J 8/0403 |
| 2017/0274339 A1 | 9/2017 | Moon et al. | |

FOREIGN PATENT DOCUMENTS

| | | |
|---|---|---|
| CN | 105899904 B | 1/2018 |
| DE | 102008044711 A1 | 3/2010 |
| EP | 1460365 A1 | 9/2004 |
| EP | 2887001 A1 | 6/2015 |
| EP | 2975353 A1 | 1/2016 |
| EP | 3115734 A1 | 1/2017 |
| JP | 2001164932 A | 6/2001 |

OTHER PUBLICATIONS

International Search Report issued in connection with PCT/EP2019/055660.

Replacing Aging Bayonet Type Boilers,: Nitrogen + Syngas, No. 332, Nov. 1, 2014, pp. 50-53.

\* cited by examiner

SHELL AND TUBE HEAT EXCHANGER

CROSS-REFERENCE TO RELATED APPLICATIONS

This application is a national phase of PCT/EP2019/055660, filed Mar. 7, 2019, and claims priority to EP 18163395.9, filed Mar. 22, 2018, the entire contents of both of which are hereby incorporated by reference.

FIELD OF APPLICATION

The invention relates to the field of shell and tube heat exchangers, in particular for applications in the chemical industry.

PRIOR ART

Shell and tube apparatuses are widely used in the field of chemical plants. For example, these apparatuses are used as preheaters or boilers to produce steam by recovering heat from a hot process fluid, for example from the effluent of an exothermic conversion section. Another application consists of the start-up heaters of ammonia reactors.

From a constructional point of view said apparatuses essentially comprise an outer shell and a tube bundle comprising straight or U-shaped tubes. A shell side, consisting of the space defined by the shell around the tubes, and a tube side, consisting of the interior of said tubes, are thus defined. A first fluid and a second fluid circulate respectively in the first side and second side.

In apparatuses with a tube bundle of considerable length, it is also known to provide a series of baffles perpendicular to the axis of the tubes, which prevent the vibrations and, optionally, divide up the space in the shell side in a suitable manner.

A number of improvements to the shell and tube apparatuses are described in the patent literature, including the following:
  U.S. Pat. Nos. 5,058,664 and 5,642,778 describe the known rod baffles configuration in which a series of parallel and suitably oriented bars form the supporting baffles of the tubes;
  EP 2 887 001 discloses an apparatus in which the tube bundle is surrounded by a non-load bearing inner shell, which cooperates structurally with the baffles and which may be realized as a segmental shell;
  EP 2 975 353 discloses an apparatus with a modular inner shell;
  EP 3 115 734 discloses a tube bundle with baffles which may be mounted freely with play with respect to the tubes and which may be fixed in position by means of a displacement (shift-lock) or a rotation (twist-lock).

Shell and tube apparatuses, especially when they operate at a high pressure and/or temperature, or in a corrosive environment, generate major costs. Costly components include for example: the outer shell, the tube bundles and the tube plates. Said components require a significant amount of high-quality material (for example alloyed steel) and, consequently, are expensive, all the more so if they have to withstand critical operating conditions which force to increase the thickness of the material or to use even higher quality materials.

Moreover, in applications which involve heat recovery with steam production, the prior art teaches using two separate apparatuses as water preheater and boiler, respectively. The hot fluid, which is typically a gas (for example produced by an exothermic synthesis reaction), passes in sequence through the boiler and the preheater.

This dual-apparatus configuration is widely used, for example, in ammonia plants in order to cool the effluent of the synthesis. It has the following advantages: the heat exchange is optimized and the two apparatuses are specifically designed for the respective working conditions. However, it has the drawback of the cost associated with the two apparatuses and the connecting piping between the boiler and the preheater, both for the hot gas and the water. Said connecting piping is costly, dissipates heat and entails head losses, especially in the part intended for the hot gas.

Referring in more detail to the ammonia plants, the working conditions of these apparatuses place the materials involved under considerable stress. The output gas from an ammonia synthesis reactor typically has a temperature of about 450° C. and a pressure of about 140 bar; moreover, it has high partial pressures of hydrogen (80-85 bar) and nitrogen (about 30 bar) and it is known that in these operating conditions hydrogen and nitrogen corrode the surface of the steels. This requires the use of high-quality steels and large-thickness walls, thus significantly increasing the costs. The piping is also a relatively costly item since it must convey a hot gas, which has high-pressure and is chemically aggressive, from the reactor to the boiler and from the boiler to the preheater. The connection piping between different apparatuses also poses a safety problem because it represents a potential source of gas leakages.

SUMMARY OF THE INVENTION

The invention proposes improving the prior art in relation to shell and tube apparatuses. More particularly, one of the objects of the invention is to reduce the cost and complexity of a heat recovery section comprising a preheater and a boiler, while maintaining the design flexibility possible with two separate apparatuses.

These objects are achieved with a shell and tube heat exchanger apparatus comprising: an outer shell, a first tube bundle and a second tube bundle coaxial with each other, wherein:
  the tubes of the first bundle are straight;
  the second bundle is arranged externally around the first bundle, and the tubes of the second bundle are U tubes comprising straight outward and return sections which are parallel to the tubes of the first bundle;
  the apparatus comprises a first inner shell and a second inner shell;
  the first inner shell surrounds the first tube bundle and is arranged between the first bundle and the second bundle;
  the second inner shell surrounds the second tube bundle and is arranged between said second tube bundle and said outer shell;
  said first and second tube bundles form a single tube side of the apparatus which can be passed through by a fluid;
  the apparatus comprises first inlet and outlet interfaces for a first fluid circulating in the shell side on the outside of the tubes, and second inlet and outlet interfaces for a second fluid circulating in said tube side;
  the apparatus is configured such that:
  the first fluid flows along the shell side passing in sequence through: a first space enclosed by the first inner shell and, subsequently, a second space defined between the first inner shell and the second shell;

the second fluid flows along the tube side passing in sequence through the second tube bundle and through the first tube bundle.

The apparatus is designed to transfer heat from said first fluid (hot fluid) to said second fluid, through the said two tube bundles.

The arrangement of the inlet and outlet interfaces of the first and second fluids, in particular, allows to obtain the described sequence of flow paths.

When passing through said first space (first flow path), the first fluid runs over the tubes of the first tube bundle; when passing through said second space (second flow path), the first fluid runs over the tubes of the second tube bundle. Consequently, along the first flow path the first fluid transfers heat to the first tube bundle, and along the second flow path it transfers heat to the second tube bundle. The heat is transferred to the first tube bundle at a temperature which is on average higher than that transferred to the second tube bundle. The second fluid, in a corresponding manner, receives heat gradually during its passage through the second tube bundle and the first tube bundle. In some embodiments the second fluid may undergo a phase change.

In a preferred embodiment at least one of the first inner shell and the second inner shell comprises a plurality of longitudinal sections connected by removable joints. In accordance with the above, at least one of the first inner shell and the second inner shell is preferably of the segmental type.

In a preferred embodiment at least one of the first inner shell and the second inner shell cooperates structurally with at least one tube bundle, resting against at least one baffle of said tube bundle. Said tube bundle and said shell consequently form a single structure. Advantageously the first inner shell cooperates structurally with the first bundle and/or the second inner shell cooperates structurally with the second bundle.

In accordance with this embodiment, said two inner shells may be made with a thin wall because they are not load-bearing, but essentially have the function of suitably conveying the fluid shell side. The load-bearing function is performed by the tube bundle. As a result of the bearing contact on one or more baffles of the tube bundle, the stresses acting on the inner shell are at least partially supported by the tube bundle. The realization of the two shells with thin wall reduces the cost, the weight and encumbrance inside the apparatus.

Further preferred aspects are described in the claims.

The apparatus according to the invention, thanks to the presence of two tube bundles and of the two shells which suitably direct the fluid shell side, may perform the function of two exchangers, in particular of a preheater and of a boiler, which consequently are integrated in a single apparatus with considerable cost savings.

In a preferred application the apparatus according to the invention operates as a preheater/boiler for the second fluid, which is advantageously water.

More preferably, a preheater-boiler apparatus according to the invention comprises a plurality of chambers for collecting and distributing the second fluid, designed for the following operations: feeding the second tube bundle; collecting the second fluid flowing out from said second tube bundle and distributing it inside the first tube bundle; collecting the at least partially evaporated fluid flowing out from the second tube bundle; optionally separating the vapour phase from the liquid phase in said outgoing fluid and reintroducing the liquid phase inside the second tube bundle.

In a preferred embodiment said plurality of chambers comprises:
a first chamber which receives the second fluid flowing into the apparatus and which communicates directly with an inlet side of the second tube bundle;
a second chamber which communicates directly with an inlet side of the first tube bundle;
a third intermediate chamber which is arranged to receive the fluid flowing out from the second tube bundle and which communicates directly with an outlet side of the first tube bundle, collecting a partially evaporated two-phase fluid stream flowing out from said first tube bundle,
wherein the third chamber is situated underneath the second chamber and said second chamber and third chamber are divided by a baffle and communicate via a vertical riser tube, so that the effluent of the first tube bundle passes from the third chamber to the second chamber via said riser tube.

Said riser tube advantageously terminates with an end which is located above the inlet of the first tube bundle. With this arrangement a liquid/vapour two-phase stream flowing out from the riser tube tends to separate the liquid phase as a result of the liquid droplets falling back downwards. The vapour phase is collected in the top part of the third chamber. A demister may also be preferably installed in the said top part of the third chamber. The third chamber preferably also operates as a gravity separator of the liquid phase and vapour phase.

In an even more preferred embodiment the apparatus comprises a first tube plate and a second tube plate, said third intermediate chamber being defined between said two tube plates. The second tube plate may form the bottom of said second chamber, which is located above the intermediate chamber.

In a preferred embodiment, the tubes of the first tube bundle are bayonet tubes, each of the bayonet tubes comprising a respective outward tube fixed to said first tube plate and a respective return tube which is coaxial with and on the outside of the outward tube, the return tube being fixed to the second tube plate. In this way the outward tube has an inlet which is open into the second chamber, while the return tube has an outlet which is open towards the third intermediate chamber.

In a preferred embodiment of the vertical apparatus, the bottom part of the apparatus houses the two coaxial tube bundles and the top part of the apparatus houses the second chamber operating as a steam collection chamber. The top part of the apparatus may also be provided with a steam drum separate from said third chamber.

In some embodiments the apparatus may envisage a natural circulation between the first tube bundle, the intermediate chamber, the riser tube and the second chamber.

As mentioned above, one of the advantages of the invention is the possibility of replacing two apparatuses with a single apparatus, while maintaining the design flexibility of two apparatuses. Compared to a dual-apparatus configuration, the following components are no longer required: a pressurized shell, the connection piping and a foundation. A further advantage is that the two inner shells may be made with a small thickness and therefore using a small amount of material.

Eliminating the connection piping and associated connections improves the safety of the plant while reducing the possibility of inflammable gas (for example Another advantage of the invention is that the replacement of two apparatuses with a single apparatus reduces the cost of the foundations and increases the compactness of the apparatuses. This represents an important advantage both for new plants and in the case of revamping of existing plants.

Another advantage of the invention consists in the fact that the flow in the shell side, owing to the presence of the two coaxial inner shells, may be directed so as to form a counterflow with respect to the fluid circulating inside the tubes, both during descent and during upflow of the water or steam.

An apparatus according to the invention may be defined as being a combined apparatus in that it is able to combine the functions of two separate apparatuses.

One aspect of the invention also relates to a method for revamping a chemical plant, in particular a plant for ammonia synthesis, in which:
the plant comprises a water preheater and a steam generator which use the heat of a process gas as heat source, and
the method is characterized by the replacement of both said preheater and said steam generator with a combined apparatus according to the present invention.

More particularly, the method according to the invention may be advantageously applied to an arrangement which envisages originally directing said process gas to a first side of the steam generator, extracting the gas from said steam generator and directing it to a first side of said preheater; feeding a stream of water to a second side of the preheater, extracting the water thus preheated and feeding it to a second side of the boiler.

The method of the invention envisages redirecting said hot gas to a corresponding hot gas inlet of said combined apparatus, and re-directing said stream of water to a corresponding water inlet of the same apparatus.

The advantages will emerge even more clearly with the aid of the detailed description below relating to a preferred embodiment of the invention provided by way of a non-limiting example.

DETAILED DESCRIPTION

Figure 1:
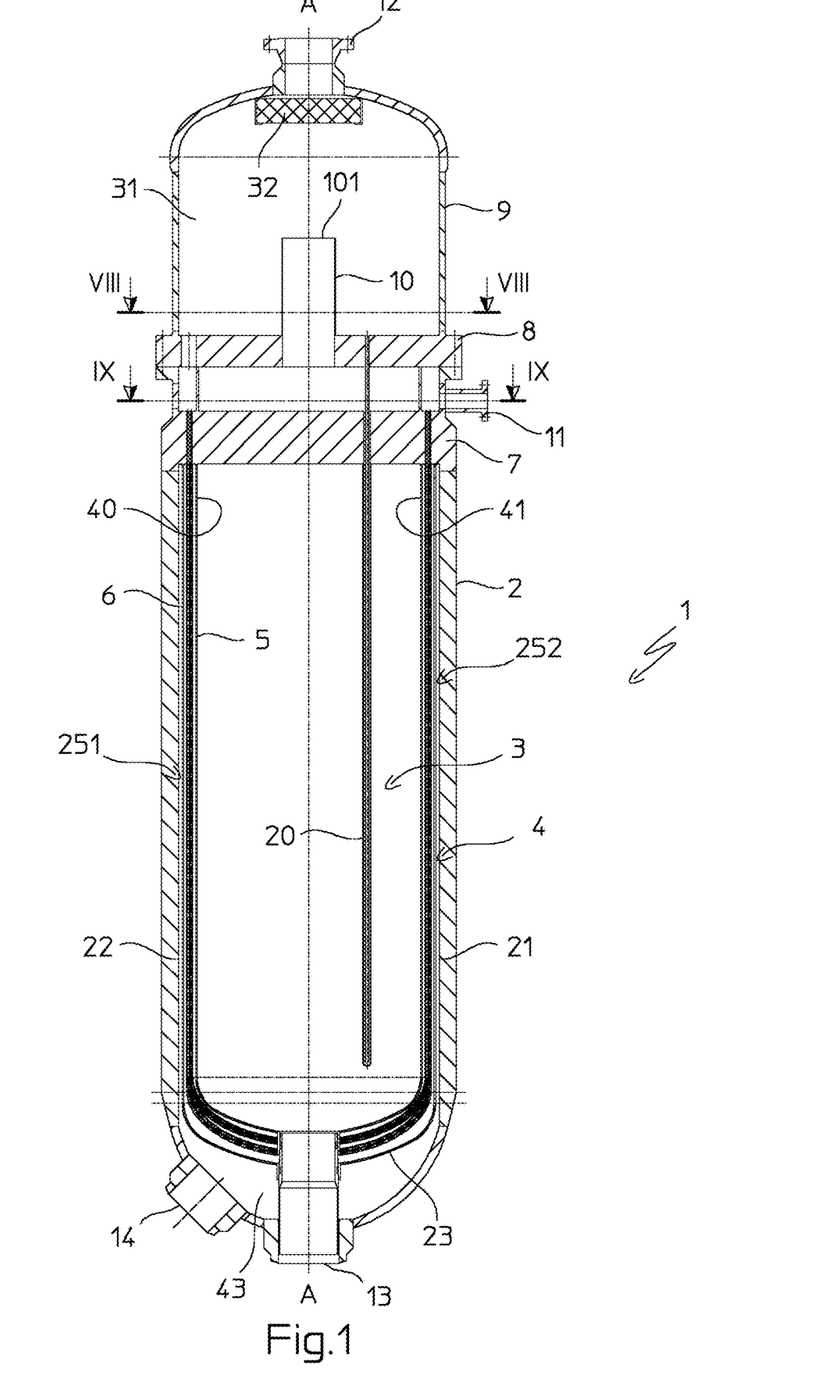
FIG. 1 shows a schematic cross-section of an apparatus in a preferred embodiment of the invention.

FIG. 1 shows in schematic form a preheater-boiler apparatus 1 according to an embodiment of the invention.

The apparatus 1 essentially comprises the following components:
outer shell 2
first tube bundle 3
second tube bundle 4
first inner shell 5
second inner shell 6
first tube plate 7
second tube plate 8
head 9 riser tube 10
water inlet 11
steam outlet 12
hot gas inlet 13
hot gas outlet 14

The tube bundles 3 and 4 are arranged coaxially, the bundle 4 being on the outside of the bundle 3.

The first bundle 3 comprises straight tubes 20 which follow a longitudinal axis A-A of the apparatus 1. In a preferred embodiment said tubes 20 are bayonet tubes 20, as will be explained in detail below. For illustrative clarity, FIG. 1 shows only one of the tubes 20.

The second bundle 4 comprises U tubes with straight outward sections 21 and straight return sections 22 parallel to the tubes 20 of the first bundle. The sections 21 and 22 are connected by curved portions 23 of the U tubes.

The first inner shell 5 surrounds the first tube bundle 3, being arranged between said first bundle 3 and the second bundle 4.

Figure 2:
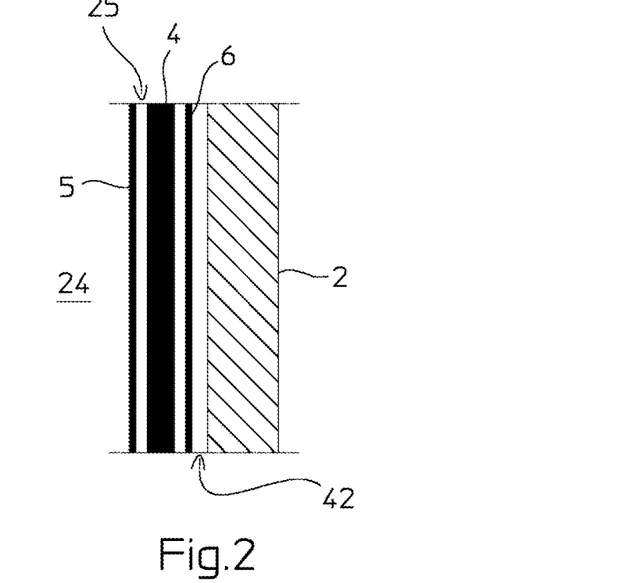
FIGS. 2 to 7 show details of the apparatus according to FIG. 1.

The second inner shell 6 surrounds the second tube bundle 4, being arranged between said second tube bundle 4 and the outer shell 2 of the apparatus (FIG. 2).

Preferably, the outer shell 2 and the inner shells 5 and 6 are cylindrical. The inner shells 5 and 6 are coaxial and concentric.

It can be noted (FIG. 2) that a space 24, enclosed by the first inner shell 5 and containing the first tube bundle 3, and an essentially annular space 25, defined between the two shells 5 and 6 and containing the second tube bundle 4, are defined. An interspace 42 between the shells 6 and 2 is also defined.

The two tube bundles 3 and 4 form a single tube side. The apparatus is intended to operate as a preheater-boiler; the tube bundle 4 in particular acts as a preheater, while the bundle 3 acts as a boiler. Therefore the water entering via the inlet 11 passes first into the preheating bundle 4 and then into the evaporation bundle 3.

The shell side of the apparatus comprises the spaces 24 and 25 where the hot gas (heat source) transfers heat respectively to the bundle 3 and the bundle 4. In particular the hot gas first passes through the space 24 and then into the space 25.

The structure and the operation of the apparatus are now described in greater detail with reference, for easier description, to the tube side and the shell side.

Tube Side (Water/Steam)

The first tube plate 7 supports both the tubes 20 of the first bundle 3 and the U tubes 21 of the second bundle 4. In particular, a central region of the plate 7 supports said tubes 20, while a peripheral region of the plate 7, essentially in the form of a ring, supports the tubes 21.

Figure 3:
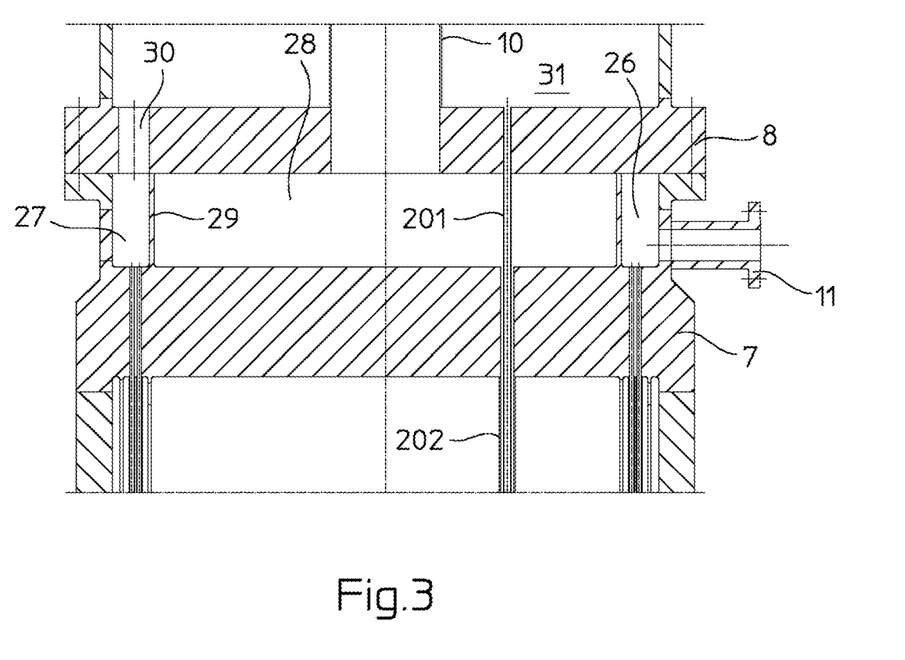

The following are defined between the first tube plate 7 and the second tube plate 8: a chamber 26 communicating with the water inlet 11 and with an inlet side of the tube bundle 4; a collection chamber 27 for preheated water which communicates with an outlet side of said tube bundle 4; a steam collection chamber 28 which communicates with an outlet side of the first tube bundle 3 (FIG. 3). Said chambers 26 and 27 are separated by a baffle 29.

A passage 30 connects the water collection chamber 27 with an overlying chamber 31 which is located inside the head 9. Moreover, the riser tube 10 connects said chamber 31 with the steam collection chamber 28.

A droplet separator (demister) 32 is optionally provided in the top part of the chamber 31, upstream of the steam outlet 12.

Figures 4, 6:
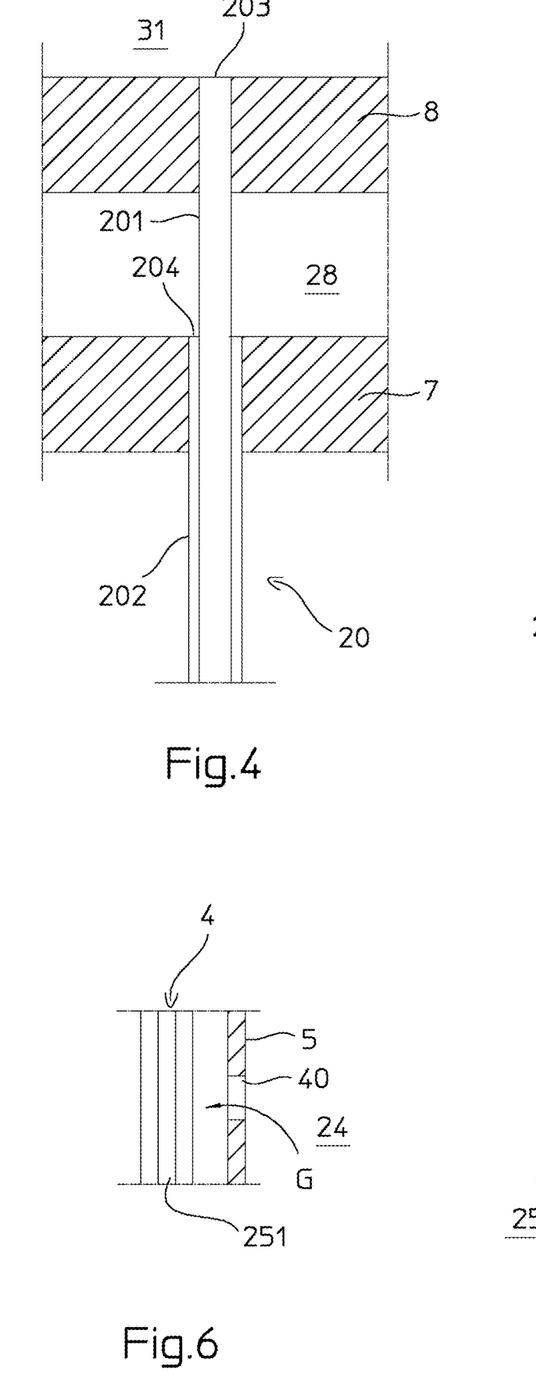
Figure 5:
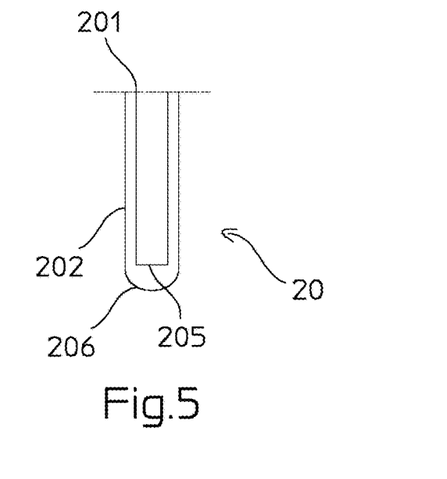

The tubes 20 of the first tube bundle 3 are bayonet tubes with a coaxial structure, which is shown by way of example in FIGS. 4 and 5.

Each bayonet tube 20 essentially comprises an outward tube 201 and a return tube 202. The outward tube 201 is fixed to the second plate 8 and has an inlet section 203 open towards the upper chamber 31. The return tube 202 is arranged coaxially around the outward tube 201 and is fixed to the first plate 7. Said return tube 202 has an outlet section 204 open towards the said steam collection chamber 28. Said outlet section 204 has an essentially annular form extending around the body of the tube 201.

The distal end of a tube 20 is shown in FIG. 5. The outward tube 201 has the distal end 205 open, while the coaxial return tube 202 has the distal end 206 which is closed.

From the above it can be noted that the apparatus 1 comprises essentially three chambers for the fluid (water or steam) circulating in the tube side:

- a first chamber consists of the chamber 26 which communicates directly with the inlet of the tube bundle 4 as well as with the water inlet 11;
- a second chamber consists of the chamber 31 which is arranged so as to receive the preheated water via the chamber 27 and the passage 30, and which communicates directly with the inlet of the first tube bundle 3, in particular with the inlets 203 of the bayonet tubes 20;
- a third intermediate chamber consists of the chamber 28 which communicates directly with the outlet of the first tube bundle 3, in particular with the outlets 204 of the bayonet tubes 20.

The third chamber 28 is situated underneath the second chamber 31 in the vertical apparatus. Said second chamber 31 and third chamber 28 are divided by the tube plate 8, which also acts as a dividing wall between the two chambers 28 and 31. A fluid passage between said two chambers is provided by the vertical riser tube 10.

It should be noted that the inlets 203 of the bayonet tubes are on the bottom of the chamber 31, substantially in the plane defined by the flange 8. The top end 101 of the riser tube 10, instead, is situated at a certain height inside the chamber 31.

Shell Side (Gas)

The gas inlet 13 communicates directly with the region 24 of the shell side, passing through the second inner shell 6. Therefore the inlet 13 allows the hot gas to be introduced into the space where the first tube bundle 3 is housed. The gas inlet 13 is positioned on the bottom of the apparatus so as to have a stream of gas directed upwards and countercurrent with respect to the water descending inside the tubes 201.

Figure 9:
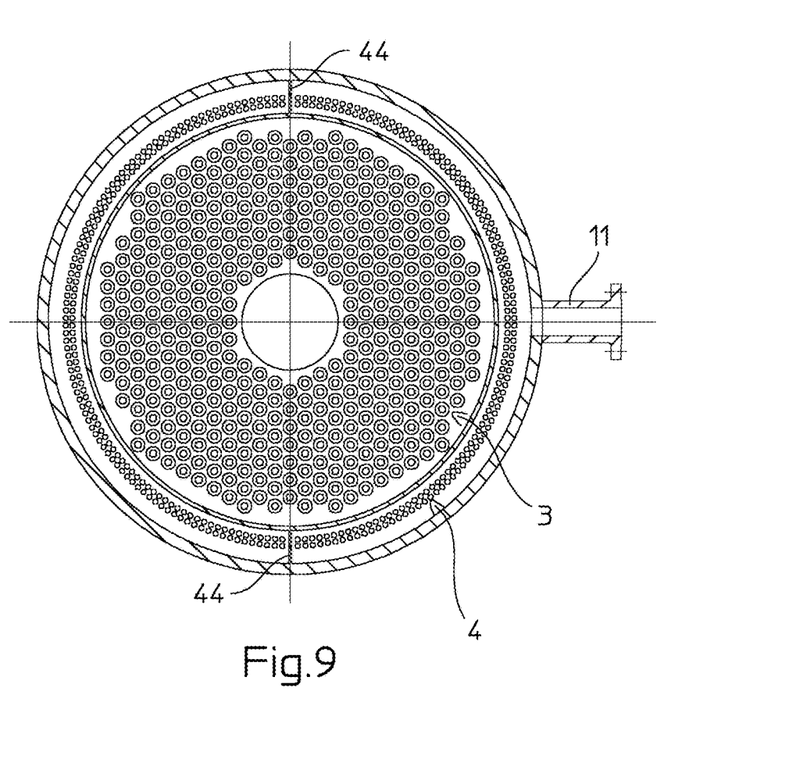

The region 25 of the shell side, i.e. the region which is defined between the inner shells 5 and 6 and inside which the preheating tube bundle 4 is located, is further divided up into two passages 251 and 252 by means of dividing walls 44 (FIG. 9).

The passage 251 is defined around the sections 22 (return sections) of the U tubes, while the passage 252 is defined around the outward sections 21 of the tubes.

The first inner shell 5 comprises first openings 40 which connect the region 26 with said passage 251 of the region 25 (FIG. 6). Said openings 40 are located preferably in the top part of the heat exchange zone, i.e. in the vicinity of the plate 7 in the position shown in FIG. 1.

The second inner shell 6 comprises second openings 41 (FIG. 7) which connect the passage 252 of the region 25 to the region 42 defined between the inner shell 6 and the pressurized outer shell 2 (also called flushing region). Said region 42 in turn communicates with a chamber 43 on the bottom of the apparatus and with the gas outlet 14.

Figure 7:
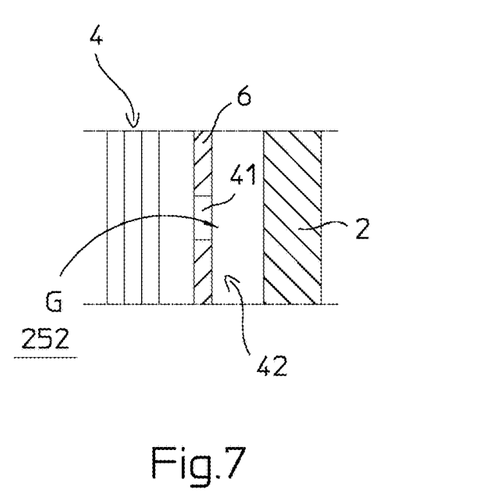
Figure 8:
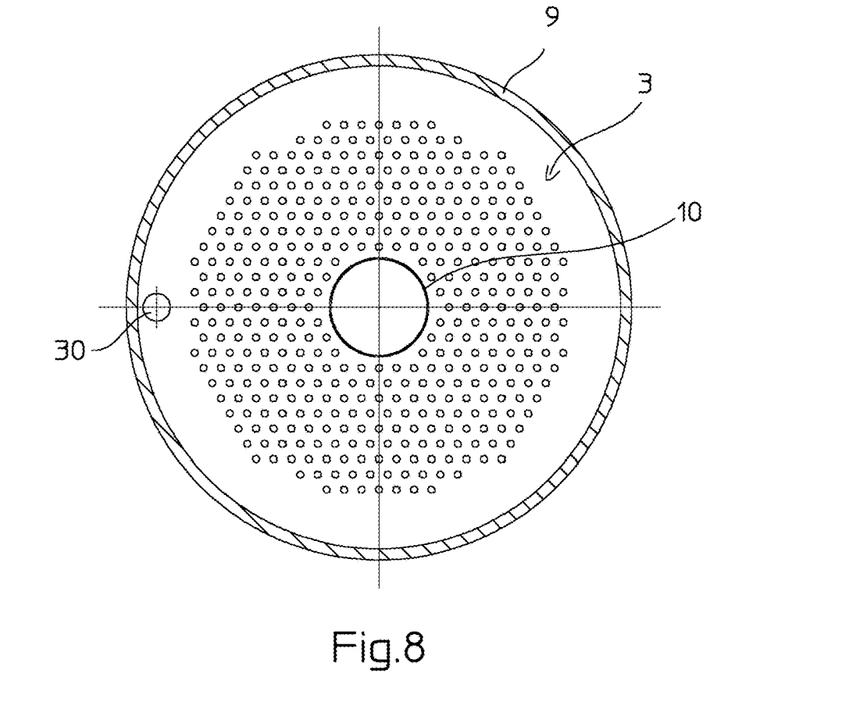
FIGS. 8 and 9 show cross-sections of the apparatus along the planes VIII-VIII and IX-IX indicated in FIG. 1.

FIGS. 6 and 7 show the hot gas passage G.

Operation of the Apparatus

The operating principle of the apparatus may now be described.

The apparatus essentially operates as a preheater and water boiler, respectively, in the tube bundles 4 and 3 exchanging heat in counterflow with the hot gas in the shell side.

The incoming water fills the chamber 26, flows downwards along the sections 21 of the U tubes and flow back up along the opposite sections 22; it flows out preheated into the chamber 27 and passes into the upper chamber 31 through the passage 30.

From the upper chamber 31, the water enters into the evaporation bundle 3 through the inlets 203 of the bayonet tubes 20 (inlets of the inner tubes 201).

Inside the bayonet tubes 20 the water evaporates at least partially. The steam, or mixed water/steam flow, thus obtained occupies the chamber 28 and flows up into the top part of the chamber 31 via the tube 10.

Any water droplets (liquid phase) present in the effluent of the tube 10 fall back by of gravity towards the bottom of the chamber 31, from where they are fed again to the tube bundle 3. The steam phase, instead, tends to flow back up towards the demister 32, where present, and steam outlet 12.

During use, the chamber 31 is partially filled with water up to a given level (underneath the outlet opening 101 of the tube 10), creating a head for the flow circulating inside the tubes 20. By suitable dimensioning, the apparatus may operate with natural circulation between chamber 31, bayonet tubes 20, intermediate chamber 28 and riser tube 10. In some embodiments, a separate steam drum may be provided above the chamber 31 in order to increase the head.

The hot gas entering via the gas inlet 13 passes firstly into the region 24 where it flows upwards in a counterflow with respect to the water descending inside the tubes. As a result of the arrangement of the openings 40 and 41, the gas subsequently crosses the passages 251 and 252 again in a counterflow with respect to the water being preheated in the bundle 4. Finally the gas passes into the interspace 42 with the effect of flushing the shell 2 and preventing overheating of said shell.

Figure 10:
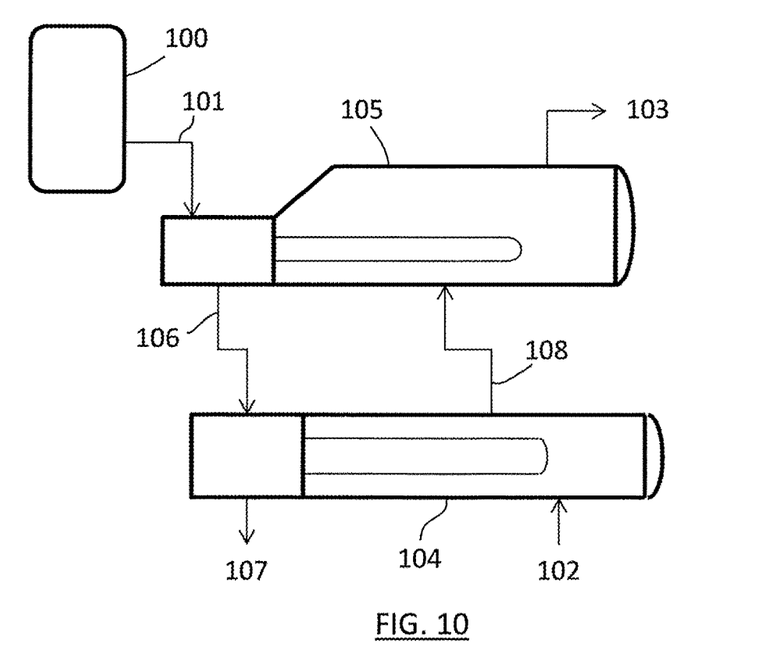
FIG. 10 shows in schematic form the arrangement of a preheater and a boiler for heat recovery from a hot gas, according to the prior art, in particular in an ammonia plant.
Figure 11:
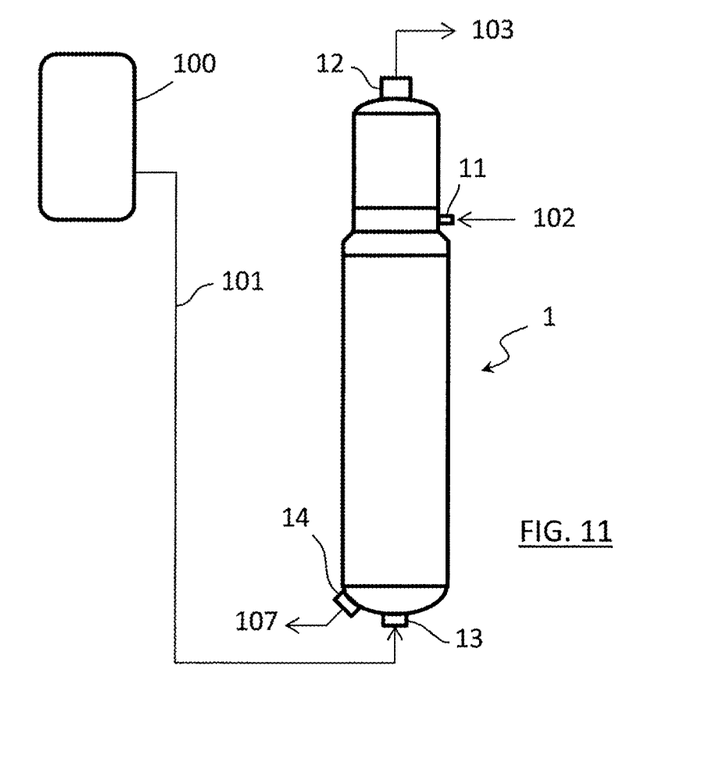
FIG. 11 shows the diagram of FIG. 10 modified with an apparatus according to the invention which replaces the preheater and the boiler.

FIGS. 10 and 11 show an application of the invention to the revamping of a chemical plant such as an ammonia plant.

FIG. 10 shows a configuration of the prior art in which a hot process gas 101 flowing out from an apparatus 100 is used as a heat source for converting a flow of water 102 into steam 103 by means of a preheater 104 and a boiler 105.

The preheater 104 and the boiler 105 are two separate apparatuses, for example two tube bundle exchangers. The apparatus 100 for example is an ammonia synthesis reactor.

The gas 101 flowing out from the reactor 100 provides heat firstly to the boiler 105; the gas 106 output from said boiler, at a lower temperature, supplies heat to the preheater 104 and flows out as cooled gas 107. In the example the gas circulates in the tube side of both the apparatuses 104 and 105.

The feed water 102 is preheated in the shell side of the preheater 104; the preheated water 108 is fed to the shell side of the boiler 105 inside which it evaporates, at least partially, forming the flow 103. FIG. 11 shows that the combined apparatus 1 according to the invention replaces both the preheater 104 and the boiler 105. The hot gas 101 is fed to the inlet 13 and the water 102 is fed to the inlet 11. The apparatus 1 produces the flow of steam 103 and the flow of cooled gas 107.

It can be seen how the invention eliminates the connection piping between the two apparatuses of the prior art, indicated by the lines 106 and 108 in FIG. 10.

By means of the apparatus it is thus possible to achieve the aforementioned purposes.

What is claimed is:

1. A shell and tube heat exchanger apparatus comprising:
   an outer shell, a first tube bundle and a second tube bundle coaxial with each other, wherein:
   the tubes of said first tube bundle are straight;
   said second tube bundle is arranged externally around the first tube bundle, and the tubes of said second bundle are U tubes comprising straight sections and straight return sections which are parallel to the tubes of the first bundle;
   the apparatus comprises a first inner shell and a second inner shell,
   said first inner shell surrounds said first tube bundle and is arranged between said first tube bundle and said second tube bundle;
   said second inner shell surrounds said second tube bundle and is arranged between said second tube bundle and said outer shell;
   said first and second tube bundles form a single tube side of the apparatus, which is passed through by a fluid;
   the apparatus comprises first inlet and outlet interfaces for a first fluid circulating in the shell side on the outside of the tubes of said first and second tube bundles, and second inlet and outlet interfaces for a second fluid circulating in said tube side;
   the apparatus is configured such that:
   the first fluid flows along the shell side passing in sequence through a first space enclosed by the first inner shell and a second space defined between the first inner shell and the second inner shell;
   the second fluid flows along the tube side passing, in sequence, first through the second tube bundle and then through the first tube bundle;
   said shell and tube heat exchanger apparatus comprising a plurality of chambers for collecting and distributing the second fluid;
   wherein said plurality of chambers comprises:
   a first chamber which receives the second fluid entering the apparatus and which communicates directly with an inlet side of the second tube bundle;
   a second chamber which is arranged to receive the fluid flowing out from the second tube bundle and which communicates directly with an inlet side of the first tube bundle;
   a third intermediate chamber which communicates directly with an outlet side of the first tube bundle, collecting an at least partially evaporated flow from said first tube bundle,
   wherein the third chamber is situated underneath the second chamber and said second chamber and third chamber are divided by a baffle and communicate via a vertical riser tube, so that the effluent of the first tube bundle passes from the third chamber to the second chamber via said riser tube.

2. The apparatus according to claim 1, wherein at least one of the first inner shell and the second inner shell comprises a plurality of longitudinal sections.

3. The apparatus according to claim 1, wherein at least one of the first inner shell and the second inner shell cooperates structurally with at least one tube bundle, resting against at least one baffle of said tube bundle.

4. The apparatus according to claim 1, comprising an inlet for said first fluid communicating with the space defined by the first inner shell inside which the first tube bundle is housed, and said first inner shell comprises passages able to distribute said first fluid in the interspace between the first and second inner shells, the second tube bundle being housed in this interspace such that the first fluid runs over the first tube bundle and the second tube bundle in sequence.

5. The apparatus according to claim 1, wherein the first tube bundle and the second tube bundle operate respectively as boiler and as preheater of the second fluid, the second fluid flowing out from the first tube bundle at least partially evaporated.

6. The apparatus according to claim 5, arranged so as to:
   distribute said second fluid, entering the apparatus, into said second tube bundle;
   collect the second fluid flowing out from the second tube bundle and distribute it in the first tube bundle;
   collect the at least partially evaporated fluid flowing out from the second tube bundle;
   separate the steam phase from the liquid phase in said outgoing fluid;
   reintroduce the liquid phase inside the second tube bundle.

7. The apparatus according to claim 1, wherein said riser tube terminates with an end inside the second chamber and said end is situated above the inlet of the first tube bundle, said second chamber thus being able to operate as a gravity separator of the liquid phase and the steam phase contained in the fluid flowing out from the first tube bundle.

8. The apparatus according to claim 7, comprising a first tube plate and a second tube plate, the third intermediate chamber being defined between said two tube plates, and the second tube plate further forming the bottom of the second chamber.

9. The apparatus according to claim 8, wherein the tubes of the first tube bundle are bayonet tubes, each of the bayonet tubes comprising a respective tube fixed to said second tube plate and a respective return tube which is coaxial with and on the outside of the tube, the return tube being fixed to the first tube plate, each bayonet tube having an inlet of the tube which is open towards the second chamber and an outlet of the return tube which is open towards the third intermediate chamber.

10. The apparatus according to claim 8, wherein the tubes of the second tube bundle are U tubes fixed to an outer ring region of said first tube plate.

11. The apparatus according to claim 1, wherein:
    the apparatus is vertical, the bottom part of the apparatus houses the two coaxial tube bundles, the top part of the apparatus houses the second chamber operating as a steam collection chamber.

12. The apparatus according to claim 11, characterized by natural circulation between the first tube bundle, the intermediate chamber, the riser tube and the second chamber.

13. A method for revamping a chemical plant, in particular a plant for ammonia synthesis, in which:
    the plant to be revamped comprises a water preheater and a steam generator which use the heat of a process gas as heat source,
    the method is characterized by replacing both said preheater and said steam generator with a single new apparatus according to claim 1.

14. The method according to claim 13, comprising:
redirecting said process gas to a hot gas inlet of said apparatus and redirecting a flow of water, initially directed to said preheater, to a water inlet of said apparatus.

\* \* \* \* \*